(12) United States Patent
Petro et al.

(10) Patent No.: US 12,556,760 B2
(45) Date of Patent: Feb. 17, 2026

(54) CREDITING EXPOSURE TO MEDIA IDENTIFIED USING SOURCE FILTERING

(71) Applicant: The Nielsen Company (US), LLC, New York, NY (US)

(72) Inventors: James Petro, Oldsmar, FL (US); Daniel J. Nelson, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 140 days.

(21) Appl. No.: 18/538,255

(22) Filed: Dec. 13, 2023

(65) Prior Publication Data

US 2025/0203155 A1 Jun. 19, 2025

(51) Int. Cl.
*H04N 21/44* (2011.01)
*G06F 16/33* (2019.01)
*H04H 60/33* (2008.01)
*H04L 9/32* (2006.01)

(52) U.S. Cl.
CPC ....... *H04N 21/44008* (2013.01); *G06F 16/33* (2019.01); *H04H 60/33* (2013.01); *H04L 9/3236* (2013.01)

(58) Field of Classification Search
None
See application file for complete search history.

(56) References Cited

U.S. PATENT DOCUMENTS

| | | | | |
|---|---|---|---|---|
| 2014/0282671 | A1* | 9/2014 | McMillan | H04N 21/44008 725/19 |
| 2019/0058903 | A1* | 2/2019 | Petro | H04L 67/568 |
| 2021/0306687 | A1* | 9/2021 | Nelson | H04N 21/254 |
| 2022/0051690 | A1* | 2/2022 | Davis | H04N 21/2541 |

* cited by examiner

*Primary Examiner* — Jason K Lin (57) ABSTRACT

In one example, a method performed by an audience measurement computing system is described. The method includes determining a source identifier that identifies a media source from which media presented by a media presentation device at a media presentation environment is received. The method also includes using meter hash keys and the source identifier as a basis to select, from stored reference hash keys representing signatures of previously-identified media, a set of reference hash keys that match the meter hash keys and correspond to the source identifier, each reference hash key associated with a corresponding media identifier, where the meter hash keys are generated based on meter signatures representing the media. The method also includes identifying the media based on the set of reference hash keys. The method also includes generating exposure data that credits exposure of an audience member at the media presentation environment to the identified media.

20 Claims, 6 Drawing Sheets

CREDITING EXPOSURE TO MEDIA IDENTIFIED USING SOURCE FILTERING

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect a method performed by an audience measurement computing system is described. The audience measurement computing system includes a processor. The method includes determining a source identifier that identifies a media source from which media presented by a media presentation device at a media presentation environment is received. The method also includes using meter hash keys and the source identifier as a basis to select, from stored reference hash keys representing signatures of previously-identified media, a set of reference hash keys that match the meter hash keys and correspond to the source identifier, each reference hash key associated with a corresponding media identifier, where the meter hash keys are generated based on meter signatures representing the media. The method also includes identifying the media based on the set of reference hash keys. The method also includes generating exposure data that credits exposure of an audience member at the media presentation environment to the identified media.

In another aspect, a non-transitory computer-readable storage medium, having stored thereon program instructions that, upon execution by a processor of an audience measurement computing system, cause performance of operations is described. The operations include determining a source identifier that identifies a media source from which media presented by a media presentation device at a media presentation environment is received. The operations also include using meter hash keys and the source identifier as a basis to select, from stored reference hash keys representing signatures of previously-identified media, a set of reference hash keys that match the meter hash keys and correspond to the source identifier, each reference hash key associated with a corresponding media identifier, where the meter hash keys are generated based on meter signatures representing the media. The operations also include identifying the media based on the set of reference hash keys. The operations also include generating exposure data that credits exposure of an audience member at the media presentation environment to the identified media.

In another aspect, an audience measurement computing system is described. The audience measurement computing system includes a processor and a non-transitory computer-readable storage medium, having stored thereon program instructions that, upon execution by the processor, cause performance of operations. The operations include determining a source identifier that identifies a media source from which media presented by a media presentation device at a media presentation environment is received. The operations also include using meter hash keys and the source identifier as a basis to select, from stored reference hash keys representing signatures of previously-identified media, a set of reference hash keys that match the meter hash keys and correspond to the source identifier, each reference hash key associated with a corresponding media identifier, where the meter hash keys are generated based on meter signatures representing the media. The operations also include identifying the media based on the set of reference hash keys. The operations also include generating exposure data that credits exposure of an audience member at the media presentation environment to the identified media.

DETAILED DESCRIPTION

I. Overview

For an audience measurement entity (AME) to identify media presented at a media presentation environment (e.g., a household including one or more audience members) and in turn measure audience exposure to the media, the media presentation environment can include one or more meter devices. One such meter device can be configured to generate signatures (also referred to herein as "meter signatures") from some aspect of media that is a media presentation device (e.g., a television) in the media presentation environment presents, and transmit the signatures to one or more servers managed by the AME and located remotely from the media presentation environment. A signature is a representation of a characteristic of the media (e.g., the audio and/or the video) that identifies the media or a part thereof. For example, a signature can be computed by analyzing blocks of audio samples for their spectral energy distribution and determining a signature that characterizes the energy distribution of selected frequency bands of the blocks of audio samples. As another example, a signature can be generated from video frames.

Using a generated meter signature, the AME server(s) can identify the media. In particular, the server compares the meter signature to reference signatures corresponding to known, identified media assets (e.g., movies, television program episodes, radio programs, commercials, and/or video clips). In some cases, to build a database of reference signatures (also referred to herein as a reference asset database), the AME receives numerous (e.g., hundreds or thousands) media streams from content providers and content consumers, generate reference signatures from those media streams, store and index the reference signatures, and also collect or determine other information for the media streams to store in association with the reference signatures, such as a media asset identifiers (MAIDs) and source identifiers for the ingested media assets (e.g., a streaming source such as Netflix®). As a specific example, the AME can generate numerous (e.g., thousands, hundreds of thousands, or more) reference signatures representing hundreds of thousands of hours or more of streaming video on demand (SVOD) content (e.g., Netflix® content, Prime Video®). The same number (or more) of linear television media assets can be generated as well. When a match between the meter signature and one of the reference signatures is found, the media presented at the media presentation environment can be identified as corresponding to the particular media asset represented by the reference signature that with matched the meter signature.

Signature matching is often performed using brute force by comparing a sequence of meter signatures representative of the media presented by the media presentation device to sequences of references signatures representative of the different reference media assets available in the reference asset database. This type of signature matching, however, can be computationally expensive and time consuming due to the number of reference signatures, often requiring a significant amount of processing power and memory. For example, brute force signature matching between a sequence of meter signatures and sequences of reference signatures representative of hundreds of thousands of hours of reference media assets can be impractical, even with high performance, cloud-based computing architectures.

Given the computationally intensive nature and expense of brute force signature matching, the AME server(s) can perform hash key matching to identify seed points in the sequence of meter signatures at which brute force signature matching can be employed against the reference signatures of a single reference media asset, rather than against the entire reference asset database. Herein, a hash key refers to a numerical representation of a signature, often one that is generalized and allows for more efficient queries of the reference asset database. Hash key matching involves the AME server(s) generating reference hash keys from the reference signatures in the sequences of reference signatures representative of the reference media assets, and storing the reference hash keys (e.g., in a reference hash table) in the reference asset database. In some examples, each reference hash key is linked or otherwise associated with (i) a MAID of the reference media asset represented by that reference hash key and (ii) a reference timestamp representing the time in the reference asset corresponding to the reference signature(s) used to generate that reference hash key. In addition, hash key matching involves the AME server(s) generating meter hash keys from the meter signatures received from the meter device. The AME server(s) use the meter hash keys to lookup or otherwise identify the matching reference hash keys in the reference hash table, from which the reference asset identifier and reference timestamps are obtained. If a sequence of meter hash keys and a corresponding matched sequence of reference hash keys for a particular reference media asset satisfy a set of one or more validation conditions, the resulting valid hash key match for that particular reference media asset is used as a seed point for brute force matching between a sequence of reference signatures corresponding to that particular reference media asset and the sequence of monitored meter signatures.

However, even with the use of hash key matching, the matching process can take a long time to complete and can be computationally expensive, especially as the number of references in the reference asset database grows over time. For example, when the reference asset database is queried using a particular meter hash key, numerous reference hash keys can be returned as match results, often hundreds or thousands. Furthermore, the time and computational expense at the AME server side can be compounded even more, repeatedly on a daily basis, due to billions, tens of billions, or hundreds of billions of reference asset database queries (or, "lookups") occurring per day, performed using meter hash keys generated from meter signatures received from over one hundred thousand meter devices.

Accordingly, the present disclosure provides methods and systems that improve the computer-driven hash key matching process, specifically by reducing the quantity of reference hash keys that the AME server(s) process during the matching process. In particular, the disclosed methods and systems can involve the AME server(s) determining a source identifier that identifies a media source from which media presented by a media presentation device at a media presentation environment is received. The source identifier can be determined, for example, using data received from another meter device (e.g., a streaming meter) at the media presentation environment, different from the meter device that generates the meter signatures as described above. The AME server(s) then use meter hash keys and the source identifier as a basis to select, from stored reference hash keys representing the reference signatures of previously-identified media, a set of reference hash keys that match the meter hash keys and correspond to the source identifier. Each such reference hash key that is stored in the reference asset database is associated with a corresponding media identifier (e.g., a corresponding MAID). The AME server(s) then identify the media based on the set of reference hash keys, and generate exposure data that credits exposure of an audience member at the media presentation environment to the identified media.

By filtering reference hash keys by source identifier in the various manners described herein, the quantity of reference hash keys that the AME server(s) process during the hash key matching process can be reduced, thus reducing the computational expense and time needed in existing solutions to identify media and credit exposure to that media.

II. Example Computing System

Figure 1:
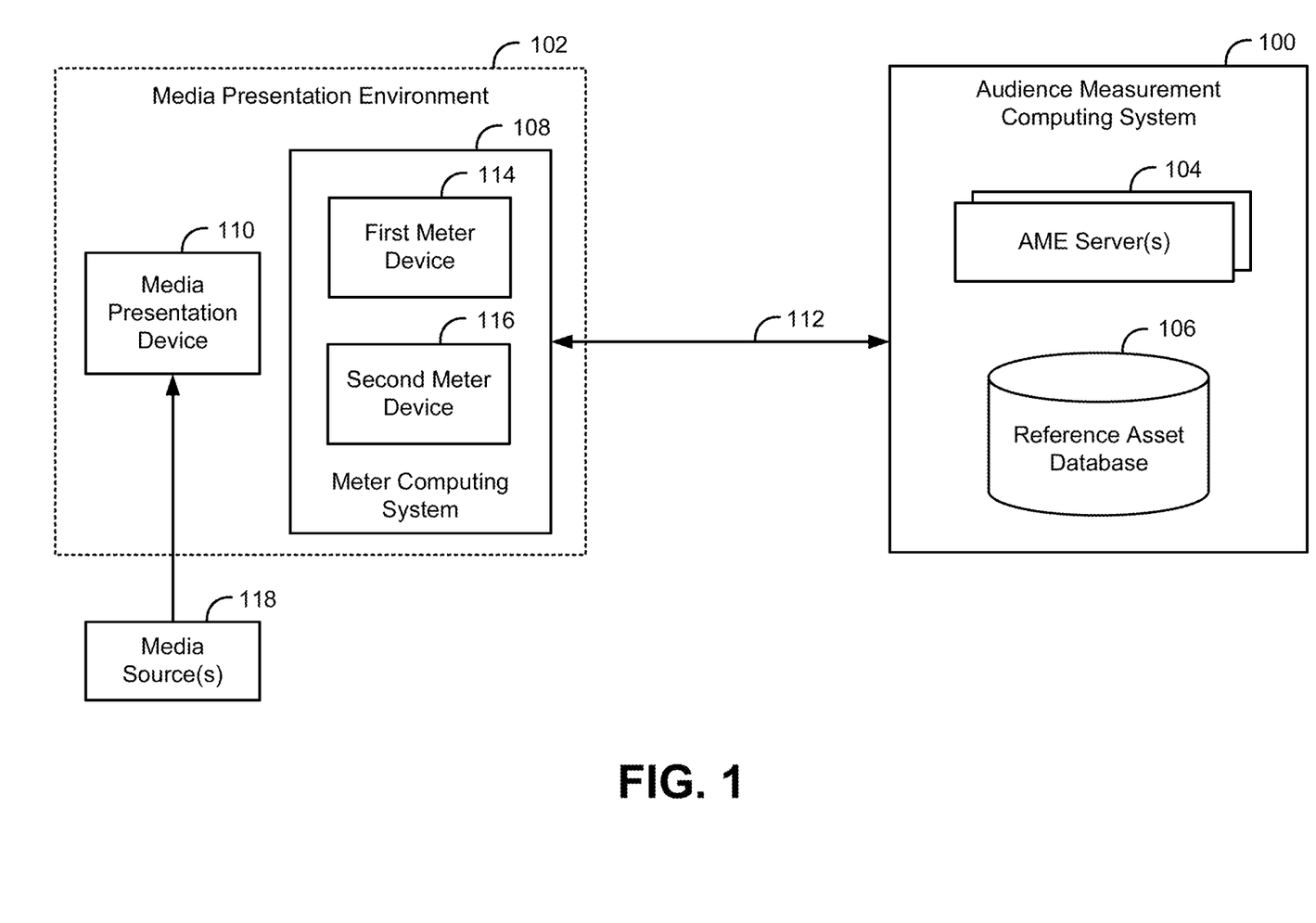
FIG. 1 is a simplified block diagram of an example audience measurement computing system in which various described operations can be implemented relative to a media presentation environment.

FIG. 1 is a simplified block diagram of an example audience measurement computing system 100 in which various described operations can be implemented relative to a media presentation environment 102. The audience measurement computing system 100 includes one or more AME servers 104 and a reference asset database 106. The media presentation environment 102 includes a meter computing system 108 and a media presentation device 110. The meter computing system 108 and the audience measurement computing system 100 are connected by a communication link 112. The meter computing system 108 includes a first meter device 114 and a second meter device 116. FIG. 1 also depicts one or more media sources 118 from which media is received for presentation at the media presentation device 110.

In some implementations, the audience measurement computing system 100 also includes the meter computing system 108, where the audience measurement computing system 100 is managed by an AME and the meter computing system 108 is provided by the AME for installation at the media presentation environment 102.

The AME server(s) 104 can include one or more servers configured to perform the operations described herein. In some examples, the AME server(s) 104 include a matching server that is configured to generate meter hash keys from meter signatures received from the meter computing system 108, and also configured to perform hash key matching. Additionally, the AME server(s) 104 can include a lookup server configured to query the reference asset database 106 for reference hash keys in the manner described herein. In other examples, matching and querying can be performed by the same server.

The reference asset database 106 can be a single database that stores the reference hash keys. Alternatively, in some examples, the audience measurement computing system 100 can include additional reference asset databases. Furthermore, although the AME server(s) 104 is/are shown as separate from the reference asset database 106, the AME server(s) 104 can include the reference asset database 106 in some implementations. Still further, the reference asset database 106 can be included as part of a larger database in some cases, or can be separate from other storage utilized by the AME server(s) 104.

The meter computing system 108 includes one or more meter devices at the media presentation environment 102, such as the first meter device 114 and the second meter device 116. Although two meter devices are shown in FIG. 1, more or less meter devices can be present in other implementations. In some examples, a meter device is a distinct computing device, different from a phone, television, laptop, or other media presentation device of the audience members of the media presentation environment 102. In other examples, a meter device can take the form of metering software installed on a media presentation device 110 such as an audience member's smartphone, television, or laptop computer.

The media presentation device 110 can take the form of any device configured to output media for presentation, such as a television, computer monitor, smartphone, tablet computer, or laptop computer, among other possibilities.

The communication link 112 can take the form of any wired or wireless communication interface, such as an Ethernet interface, cellular interface, Wi-Fi interface, or Bluetooth® interface. The communication link 112 can allow the meter computing system 108 and the audience measurement computing system 100 to connect with each other and/or communicate with each other over a computer network (e.g., a home Wi-Fi network, cloud network, or the Internet) in accordance with one or more communication protocols.

In some examples, the first meter device 114 monitors the media presentation device 110 to detect audio and/or video when media is presented on the media presentation device 110, and then generates meter signatures representing that media as described above. For example, the first meter device 114 can listen with a microphone for audio presented within the media presentation environment 102 and/or by capturing images of a video presented on the media presentation device 110 via a camera or sensor. The first meter device 114 is also configured to transmit the meter signatures to the AME server(s) 104 over the communication link 112. In some cases, the first meter device 114 transmits additional information to the AME server(s) 104 with the meter signatures, such as timestamps indicating when the media was presented.

In some examples, the second meter device 116 is a streaming meter that is configured to monitor network traffic on a network of the media presentation environment 102, including network traffic being transmitted to the media presentation device 110 when the media presentation device 110 accesses media from the Internet to present, and/or network traffic that is being transmitted to the media presentation device 110 by another computing device (e.g., a Roku® player) that is accessing media from the Internet and providing that media to the media presentation device 110.

The streaming meter can also be configured to collect network traffic data associated with the monitored network traffic and transmit the network traffic data to the AME server(s) 104 over the communication link 112. The streaming meter can be separate from a network router (not shown) of the media presentation environment 102.

The media source(s) 118 can take the form of any server, collection of servers, or other computing systems configured to provide media to an audience via a network (e.g., the Internet) or other communication channels. The media source(s) can be associated with any one or more types of media provider(s), such as a streaming provider, a cable media service provider, a radio frequency (RF) media provider, or a satellite media service provider, among other possibilities. As a specific example, the media source(s) 118 can be or include a streaming media source (e.g., Netflix®).

III. Example Operations

The audience measurement computing system 100 and/or components thereof (e.g., the AME server(s) 104) can be configured to perform and/or can perform one or more operations. Examples of these operations and related features will now be described.

As indicated above, the AME server(s) 104 can perform hash key matching to identify valid hash key match(es) between meter hash keys generated from meter signatures. A simplified example of this process will be described in connection with FIG. 2.

Figure 2:
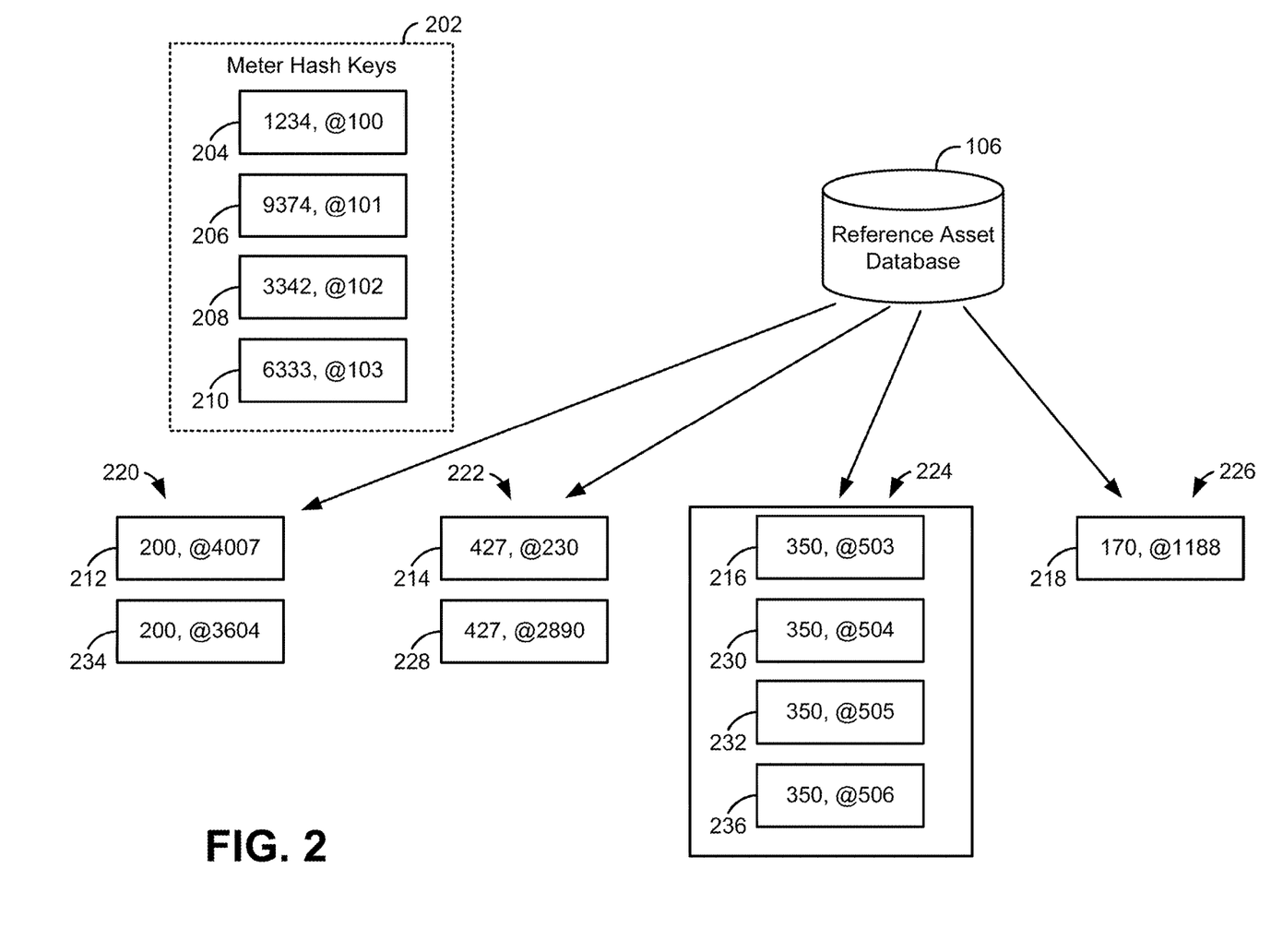
FIG. 2 is a simplified illustration of an example in which the audience measurement computing system identifies valid hash key match(es) between meter hash keys and reference hash keys.

FIG. 2 is a simplified illustration of an example in which the audience measurement computing system 100 identifies valid hash key match(es) between meter hash keys generated from meter signatures representative of media monitored by the meter computing system 108 (e.g., by the first meter device 114) and reference hash keys generated from reference signatures representative of a collection of reference media assets maintained by the audience measurement computing system 100 and stored in the reference asset database 106.

In the example scenario illustrated by FIG. 2, the audience measurement computing system 100 has generated an example sequence of meter hash keys 202 from meter signatures received from the meter computing system 108. The sequence of meter hash keys 202 includes example meter hash keys 204, 206, 208 and 210, each of which includes a respective hash value and timestamp. As the first meter device 114 generates the meter signatures, it timestamps the meter signatures so that the audience measurement computing system 100 can determine what time the audience viewed the media from which the meter signatures were generated. For example, meter hash key 204 includes a hash key of 1234 and a timestamp of @100, which represents one second. Next, meter hash key 206 includes a hash key of 9374 and a timestamp of @101, which represents a one second increment from the previous meter hash key (i.e., two seconds). Next, meter hash key 208 includes a hash key of 3342 and a timestamp of @102, and meter hash key 210 includes a hash key of 6333 and a timestamp of @103.

In the illustrated example, the audience measurement computing system 100 queries the reference asset database 106 for reference hash key(s) matching the meter hash key 204. In the illustrated example, the audience measurement computing system 100 identifies four example reference hash keys 212, 214, 216 and 218 that match the meter hash key 204 (e.g., due to hash collisions). The reference hash keys 212, 214, 216 and 218 are associated with corresponding reference media assets having respective MAIDs, 200, 427, 350 and 170. Each of the reference hash keys 212, 214, 216, and 218 is also associated with a respective timestamp. Each such timestamp represents a time, relative to a start time of the reference media asset, to which the reference hash key (and thus, the portion of the reference media asset represented by the reference hash key) corresponds.

Thus, the audience measurement computing system 100 creates four example data structures 220, 222, 224 and 226 (e.g., data buckets) to store the matching reference hash keys corresponding to MAIDs 200, 427, 350 and 170, respectively, as shown. Contrary to the simplified example shown in FIG. 2, the audience measurement computing system 100 will often receive numerous results to a query for a particular meter hash key in practice, such as a few thousand, which can take a long time to process.

Next, the audience measurement computing system 10) queries the reference asset database 106 for reference hash key(s) matching the meter hash key 206. In the illustrated example, the audience measurement computing system 100 identifies two example reference hash keys 228 and 230 that match the meter hash key 206 (e.g., due to hash collisions). The reference hash keys 228 and 230 are associated with corresponding reference media assets having respective MAIDs 427 and 350. Thus, the audience measurement computing system 100 stores the matching reference hash key 228 in the data structure 222 associated with MAID 427, and stores the matching reference hash key 230 in the data structure 224 associated with MAID 350.

Next, the audience measurement computing system 100 queries the reference asset database 106 for reference hash key(s) matching the meter hash key 208. In the illustrated example, the audience measurement computing system 100 identifies one example reference hash key 232 that matches the meter hash key 208. The reference hash key 232 is associated with the corresponding reference media asset having MAID 350. Thus, the audience measurement computing system 100 stores the matching reference hash key 232 in the data structure 224 associated with MAID 350.

Next, queries the reference asset database 106 for reference hash key(s) matching the meter hash key 210. In the illustrated example, the audience measurement computing system 100 identifies two example reference hash keys 234 and 236 that match the meter hash key 210 (e.g., due to hash collisions). The reference hash keys 234 and 236 are associated with corresponding reference media assets having respective MAIDs 200 and 350. Thus, the audience measurement computing system 100 stores the matching reference hash key 234 in the data structure 220 associated with MAID 200, and stores the matching reference hash key 236 in the data structure 224 associated with MAID 350.

Next, the audience measurement computing system 100 evaluates the data structures 220, 222, 224 and 226 for the different reference media assets identified by MAIDs 200, 427, 350 and 170, respectively, to determine whether any of the sequences of matching reference hash keys compared with the sequence of meter hash keys 202 corresponds to a valid hash key match. In the illustrated example, the audience measurement computing system 100 determines that the sequence of matching reference hash keys 216, 230, 232 and 236 stored in the data structure 224 of MAID 350 correspond to a valid hash key match with the sequence of meter hash keys 202 because the sequence of matching reference hash keys 216, 230, 232 and 236 stored in the data structure 224 satisfies a set of one or more validation conditions. For example, the sequence of matching reference hash keys 216, 230, 232 and 236 stored in the data structure 224 include at least a threshold number of matching hash keys, which satisfies a first validation condition, and exhibit a time progression that matches the time progression of the sequence of meter hash keys 202, which satisfies a second validation condition. Additionally or alternatively, the audience measurement computing system 100 can use the timestamps from the meter hash keys and the reference hash keys to calculate a delta between the timestamps, and if all of the reference hash keys in a particular data structure have the same delta, that can satisfy another validation condition.

Further, the audience measurement computing system 100 determines that the other data structures 220, 222 and 226 do not correspond to valid hash key matches. Thus, in the illustrated example, the audience measurement computing system 100 identifies the data structure 224 as a valid hash key match, and outputs MAID 350 and the reference timestamp range of 503 to 506 as the seed point to be used by the audience measurement computing system 100 to select the sequence of reference signatures for brute force signature comparison.

As indicated above, the aforementioned process can be computationally expensive and can produce a lot of results. Thus, the present disclosure improves this process at least in part by using a source identifier to reduce the quantity of reference hash keys that the audience measurement computing system 100 processes during the matching process (e.g., reducing a few thousand possible hash collision results to a few hundred).

To facilitate this, the audience measurement computing system 100 determines a source identifier that identifies a media source (e.g., one of media source(s) 118, such as a streaming media source) from which media presented by the media presentation device 110 at the media presentation environment 102 is received.

In some examples, the act of determining the source identifier can involve receiving network traffic data from the meter computing system 108 (e.g., from the streaming meter, as discussed above). As indicated above, the meter computing system 108 can be configured to monitor network traffic to the media presentation device 110, collect the network traffic data, and transmit the network traffic data to the audience measurement computing system 100. The network traffic data can include an Internet Protocol (IP) address, a domain name, and/or a uniform resource locator (URL) associated with the media source. The audience measurement computing system 100 can store and access data that maps known IP addresses, domain names, and/or URLs to corresponding media sources, and can refer to this data to determine the source identifier. For example, the audience measurement computing system 100 can store a table or other data structure that correlates each of a plurality of source identifiers to one or more IP addresses and one or more domain names associated with that source identifier. The network traffic data can also include timestamps for a start time and an end time for a viewing session (e.g., a start time and end time for a session during which streaming media was streamed to the media presentation device 110).

Additionally or alternatively, the act of determining the source identifier can involve determining the source identifier based on predetermined audience data that maps, to one or more source identifiers, a media presentation environment identifier of the media presentation environment 102 and/or an audience member identifier of an audience member. To facilitate this, the AME can assign each of its panelist households a unique identifier and/or assign each panelist within each household a unique identifier. Based on data gathered from a panelist household, such as by way of an online survey of the panelists of that household and/or from audience behavior data monitored using the meter computing system 108, the AME can determine preferred or otherwise commonly-used media sources for that panelist household or, more granularly, on a per-panelist basis.

For example, the media presentation environment 102 can be a panelist household in which two audience members reside. The AME can assign the identifier, HH1, to the household, can assign the identifier, AM1, to a first audience member, and can assign the identifier. AM2, to a second audience member. Based on survey data or audience behavior data, the first audience member indicates that they subscribe to, and frequently use (e.g., five days per week or more). Netflix® and Hulu® streaming services, and the second audience member indicates that they subscribe to, and frequently use, Netflix® and Prime Video® streaming services. As a result, the audience measurement computing system 100 can store a table or other data structure that correlates (i) AM1 to respective source identifiers for Netflix® and Hulu®, (ii) AM2 to respective source identifiers for Netflix® and Prime Video®, and (iii) HH1 to respective source identifiers for Netflix®, Hulu®, and Prime Video®.

Predetermined audience data, as described above, can be a useful supplement to network traffic data, or can be a basis for determining or inferring what the source identifier in a situation in which a streaming meter is not present in the media presentation environment 102.

Having determined the source identifier, the audience measurement computing system 100 uses meter hash keys and the source identifier as a basis to select, from the reference hash keys stored in the reference asset database 106, a set of reference hash keys that match the meter hash keys and correspond to the source identifier, each reference hash key associated with a corresponding MAID. As indicated above, the meter computing system 108 can generate meter signatures representing the media and transmit the meter signatures to the audience measurement computing system 100, which then receives the meter signatures and generates the meter hash keys based on the meter signatures.

In some examples, data in the reference asset database 106 can be organized such that the reference hash keys are sorted by source identifier before a query is made. For instance, the reference asset database 106 can be loaded up at runtime to sort the reference hash keys by source identified. The reference asset database 106 is thus, in essence, configured to filter reference hash keys by source identifier. In other examples, the reference hash keys might not be sorted before a query is made. Other examples are possible as well.

Furthermore, some implementations of the reference asset database 106 can include a single table of reference hash keys and corresponding source identifiers. In other implementations, the reference asset database 106 can include multiple separate tables, each table assigned to a particular source identifier and including only reference hash keys corresponding to that source identifier. In still other implementations, the audience measurement computing system 100 can include multiple separate databases, each database assigned to a particular source identifier and including only reference hash keys corresponding to that source identifier. Other implementations are possible as well.

Selecting the set of reference hash keys can be implemented in various ways. In one implementation, the audience measurement computing system 100 can be configured to add a reference hash key to a data structure (e.g., add reference hash key 216, having MAID 350, to data structure 224) only if the reference hash key is associated with the source identifier. More particularly, for each of the meter hash keys, the audience measurement computing system 100 can the reference asset database 106 for one or more reference hash keys that match the meter hash key. Then, for each of the one or more reference hash keys, the audience measurement computing system 100 can (i) determine that the reference hash key corresponds to the source identifier, and (ii) based on the determination that the reference hash key corresponds to the source identifier, store the reference hash key in a data structure associated with a particular one of the MAIDs. Phrased another way, as the query returns reference hash keys and the audience measurement computing system 100 is creating data structures of like MAIDs, the audience measurement computing system 100 will not add a reference hash key to a particular data structure unless that reference hash key corresponds to the source identifier, and will not create a data structure in the first place unless the first reference hash key for that data structure corresponds to the source identifier. The audience measurement computing system 100 (e.g., a matching server) will discard any query result that does not correspond to the source identifier.

For example, with reference to FIG. 2, when the audience measurement computing system 100 determines that the source identifier is a domain name for Netflix®, the audience measurement computing system 100 would only add reference hash keys 216, 230, 232, and 236 to data structure 224 based on a determination that they match one of the meter hash keys and correspond to the source identifier.

Figure 3:
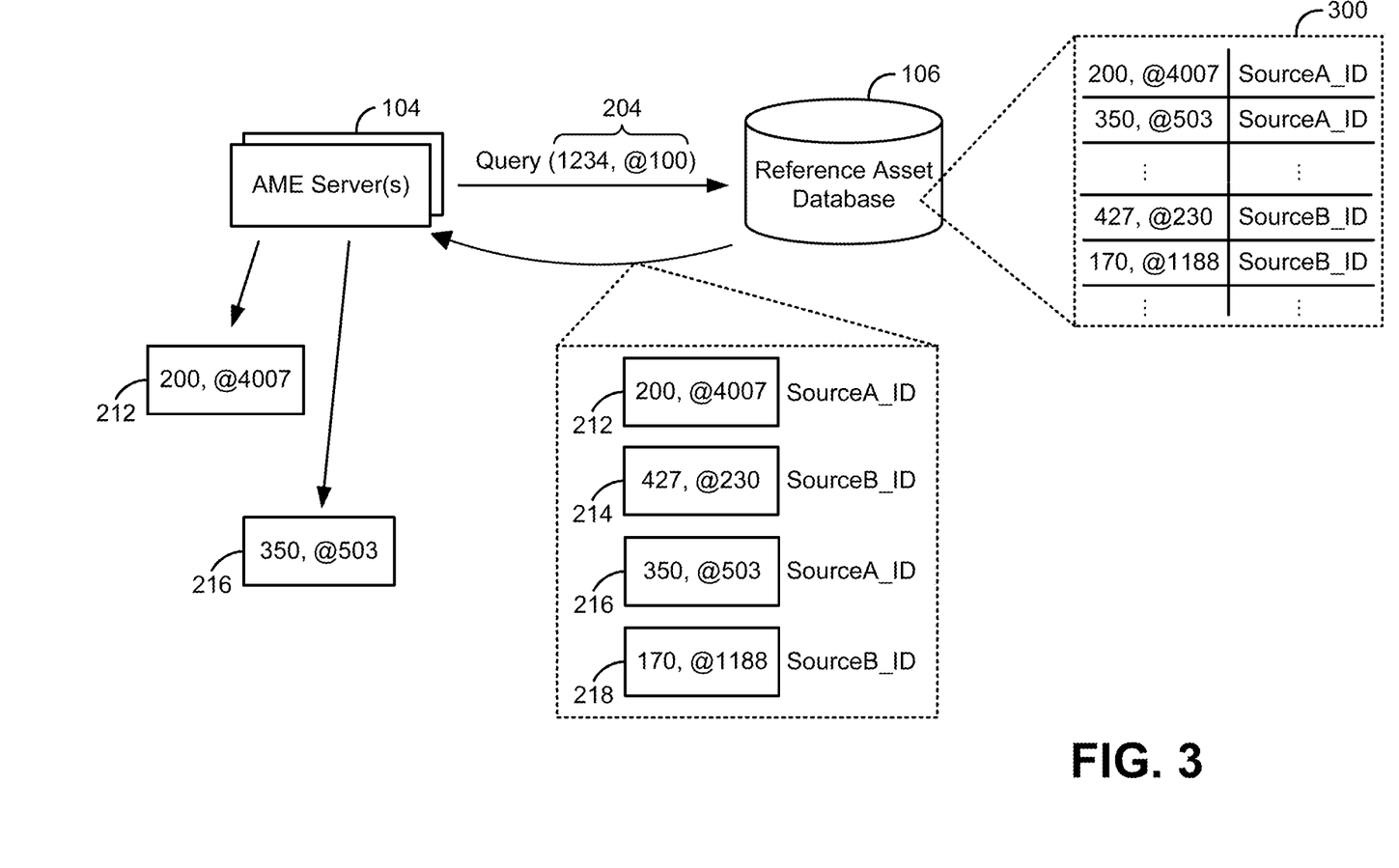
FIG. 3 is a simplified illustration of an example in which the audience measurement computing system queries a reference asset database using a source identifier.

Even more specifically. FIG. 3 illustrates a situation in which the AME server(s) 104 queries the reference asset database 106 for reference hash key(s) matching the meter hash key 204. In the illustrated example, the reference asset database 106 identifies and returns four reference hash keys 212, 214, 216 and 218 that match the meter hash key 204, along with a respective source identifier to which each reference hash key corresponds. To facilitate this, the reference asset database 106 includes a table 300 in which reference hash keys are organized by source identifier. Upon receiving the reference hash keys 212, 214, 216 and 218, the AME server(s) 104 can use the source identifiers returned along with the reference hash keys 212, 214, 216 and 218, and also use the source identifier determined from the network traffic data as described above, as a basis to select which of the reference hash keys 212, 214, 216 and 218 should be added to one or more data structures. For example, if the AME server(s) 104 determine that the source identifier is SourceA_ID, the AME server(s) 104 will only select reference hash keys 212 and 216.

In another implementation, the audience measurement computing system 100 can be configured query the reference asset database 106 only for reference hash keys that are associated with the source identifier. More particularly, for each of the meter hash keys, the audience measurement computing system 100 can, for each of the meter hash keys, query the reference asset database 106 for one or more reference hash keys that match the meter hash key and correspond to the source identifier. The audience measurement computing system 100 can then receive the set of reference hash keys from the reference asset database 106 in response to the querying. Phrased another way, the audience measurement computing system 100 queries in such a way where the reference asset database 106 will not return any reference hash keys that do not correspond to the source identifier. To facilitate this implementation, the reference asset database 106 can include data that maps reference hash keys to respective source identifiers, as described above, and in some cases, can include multiple databases (or database partitions) organized by source identifier. Such an implementation might result in more efficient matching due to the queries being more likely to return desired results that correspond to the source identifier, and thus returning a lower quantity of results overall.

For example, with reference to FIG. 2, when the audience measurement computing system 100 determines that the source identifier is an IP address for Netflix®, the audience measurement computing system 100 would only query the reference asset database 106 for reference hash keys corresponding to the source identifier for Netflix®. In other words, reference hash keys 216, 230, 232, and 236 might each correspond to the source identifier for Netflix® and will thus be returned in response to the query.

Figure 4:
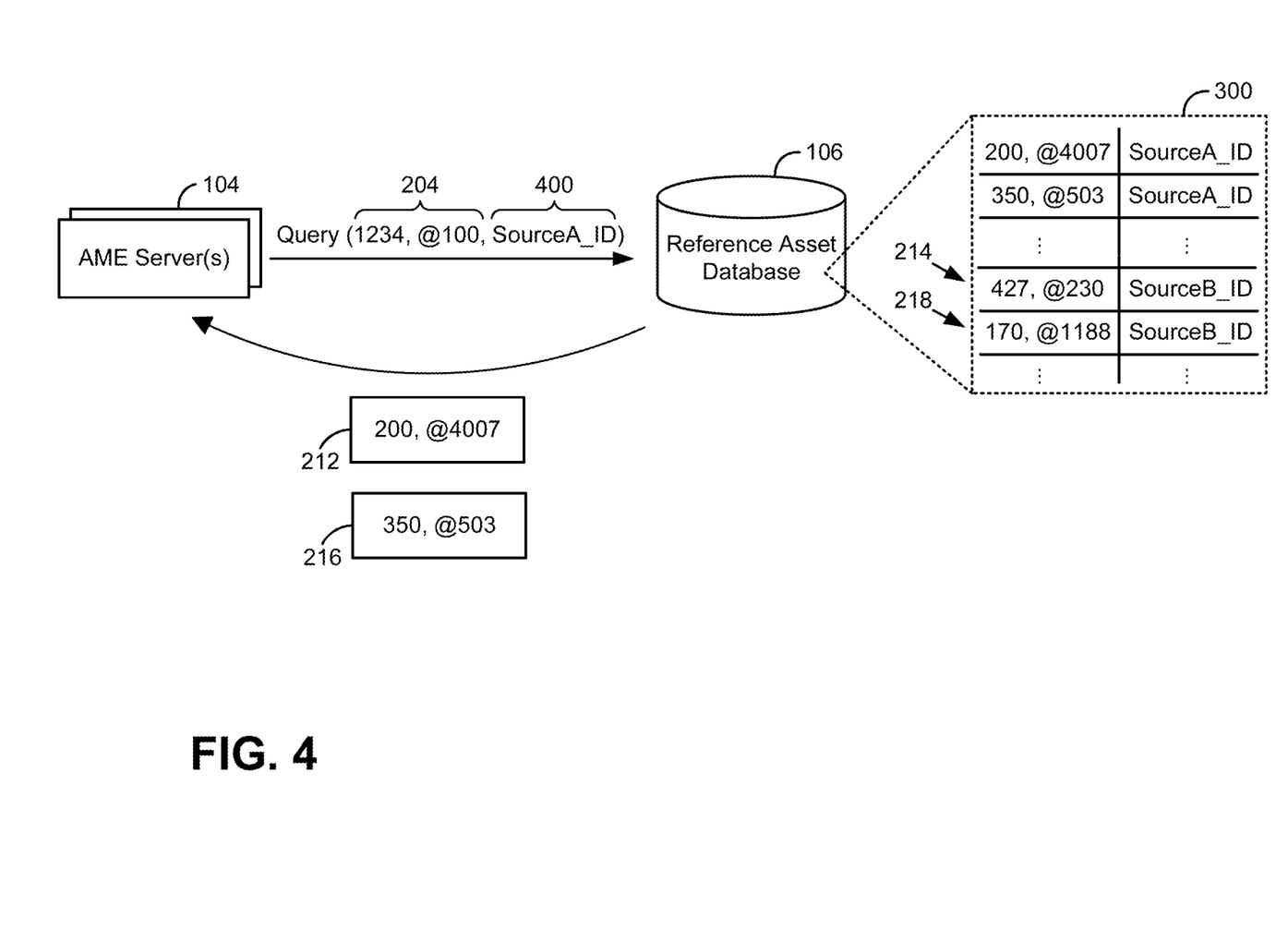
FIG. 4 is a simplified illustration of another example in which the audience measurement computing system queries a reference asset database using a source identifier.

Even more specifically, FIG. 4 illustrates a situation in which the AME server(s) 104 queries the reference asset database 106 for reference hash key(s) matching the meter hash key 204. In the illustrated example, the query also includes the source identifier, SourceA_ID. The reference asset database 106 then identifies and returns two reference hash keys 212 and 216 that match the meter hash key 204 and correspond to the source identifier. To facilitate this, the reference asset database 106 includes the table 300 in which reference hash keys are organized by source identifier. The reference asset database 106 does not return reference hash keys 214 and 218 because they correspond to a different source identifier, SourceB_ID.

Using any of the implementations described above, the audience measurement computing system 100 can control and limit the quantity and size of data structures that are analyzed for validity, thus reducing time and computational resources spent doing so.

Having selected the set of reference hash keys, the audience measurement computing system 100 identifies the media based on the set of reference hash keys. For example, the set of reference hash keys returned based on any of the implementations described above can be spread across multiple data structures, each data structure including a respective sequence of reference hash keys corresponding to the source identifier. The audience measurement computing system 100 can then select, from the set of reference hash keys, a subset of reference hash keys that satisfy a set of validation conditions, and identify the media based on that selected subset of reference hash keys.

For example, the audience measurement computing system 100 can analyze one or more of the data structures returned from the query and identify which data structure(s) include a sequence of reference hash keys that satisfies a set of one or more validation conditions, as described above. Based on the determination that a data structure includes a sequence of reference hash keys that satisfies the set of validation conditions, the audience measurement computing system 100 can use the resulting valid hash key match for that particular media asset as a seed point for brute force matching between a sequence of reference signatures corresponding to that particular media asset and the sequence of generated meter signatures. This matching can result in identification of the media as corresponding to the MAID for which the validated data structure was created.

The audience measurement computing system 100 also generates exposure data that credits exposure of an audience member at the media presentation environment 102 to the identified media. The exposure data can include, for example, demographics for the audience member (e.g., age, gender, location) and an identifier of the media (e.g., the MAID or another type of identifier of the media). In some cases, the audience measurement computing system 100 can determine the demographics for the audience member based on a user identifier for the audience member (e.g., email address or a unique identifier generated by the AME and associated with the audience member) and/or a device identifier for the media presentation device 110 (e.g., a MAC address or a unique identifier generated by the AME and associated with the media presentation device 110).

In some examples, the exposure data can take the form of a rating for the media, or exposure metrics that are then used to determine one or more of a demographic reach of the media, the rating for the media, audience engagement with the media, and/or other metrics.

In some examples, the audience measurement computing system 100 can generate a report that includes the exposure data. The report can be prepared based on a request received from a third party (e.g., an advertiser or a media publisher). The report can be prepared on a recurring basis (e.g., once a month). The audience measurement computing system 100 can display the report on a display device of the audience measurement computing system 100, such as a computer monitor. Additionally or alternatively, the audience measurement computing system 100 can transmit the report over the Internet to a computing system that is separate and remote from the audience measurement computing system 100, such as a computing system managed by a third-party entity, different from the AME. An administrator or other individual of the third-party entity who has access to the computing system can then view the report on a display of the computing system.

In some implementations, a database that is local to the meter computing system 108 (e.g., memory of the first meter device 114) can include at least a portion of the data stored in the reference asset database 106. Such a local database can include other data as well. For example, additionally or alternatively to using network traffic data and/or predetermined audience data to determine the source identifier, the first meter device 114 can locally store data that maps each of a plurality of source identifiers to reference audio, reference signatures, reference hash keys, or other reference data that enables the first meter device 114 to determine the source identifier and then transmit the source identifier to the audience measurement computing system 100 (e.g., along with meter signatures and timestamps). As a more particular example, the first meter device 114 can store, for each of a plurality of streaming media services, signatures of known jingles (e.g., that play out when a user opens the application for that service) and/or splash screen sounds, along with associated time information. As such, the first meter device 114 can detect audio and/or video from the media presentation device 110, compare a signature of that audio and/or video to the signatures in its local database, determine that the media presentation device 110 has played out a jingle or a splash screen for a particular streaming media service, and then transmit the source identifier for that streaming media service to the audience measurement computing system 100. Additionally or alternatively, the data stored at the first meter device 114 can map each of the plurality of source identifiers to signatures of the program content on streaming media services, such as signatures of jingles, theme songs, frames in an opening or closing credits, or other audiovisual content known to be associated with those streaming media services (e.g., TV programs that are streaming exclusively by a particular streaming meter service).

In some implementations, the audience measurement computing system 100 can use timestamps received as part of the network traffic data as a basis for guiding the matching operations described above. For example, the network traffic data received from the second meter device 116 can indicate that an audience member watched Netflix® from 1:00 pm to 2:00 pm, Prime Video® from 2:00 pm to 3:00 pm, and then an unknown streaming source from 3:00 pm to 4:00 pm. Using those timestamps, as well as the meter signatures, the audience measurement computing system 100 can match against only Netflix® reference hash keys corresponding to the 1:00 pm to 2:00 pm period, and against only Prime Video® reference hash keys corresponding to the 2:00 pm to 3:00 pm period. For the 3:00 pm to 4:00 pm period, the meter hash keys from that period can be matched unfiltered against a full SVOD library of reference hash keys in the reference asset database 106.

Although the example operations described herein are performed with respect to hash keys, it should be understood that the operations can be performed using signatures, without generating hash keys based on those signatures. For example, the audience measurement computing system 100 can use meter signatures and the source identifier as a basis to select, from stored reference signatures of previously-identified media, a set of reference signatures that match the meter signatures and correspond to the source identifier, and then use the set of reference signatures to identify, and credit exposure to, the media.

Figure 5:
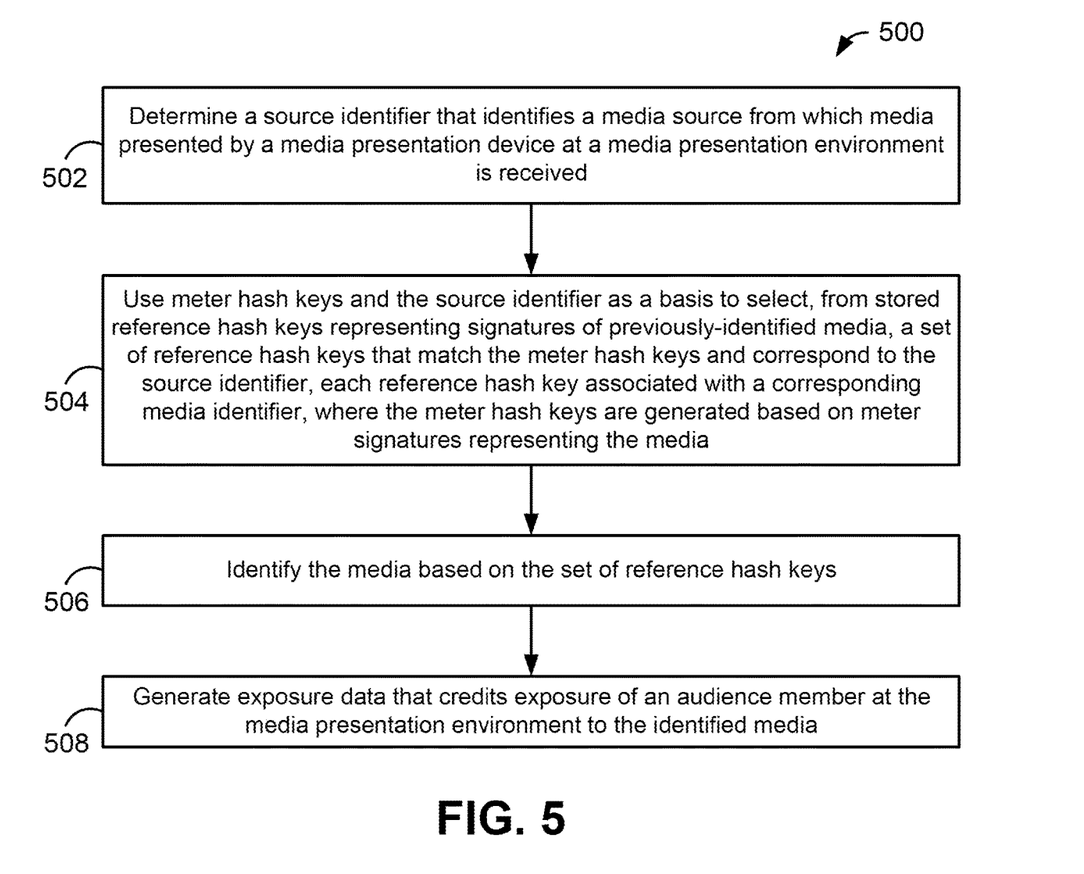
FIG. 5 is a flow chart of an example method.

FIG. 5 is a flow chart of an example method 500. Method 500 can be carried out by audience measurement computing system 100, or more particularly by the AME server(s) 104. At block 502, method 500 includes determining a source identifier that identifies a media source from which media presented by a media presentation device at a media presentation environment is received. At block 504, method 500 includes using meter hash keys and the source identifier as a basis to select, from stored reference hash keys representing signatures of previously-identified media, a set of reference hash keys that match the meter hash keys and correspond to the source identifier, each reference hash key associated with a corresponding media identifier, where the meter hash keys are generated based on meter signatures representing the media. At block 506, method 500 includes identifying the media based on the set of reference hash keys. And at block 508, method 500 includes generating exposure data that credits exposure of an audience member at the media presentation environment to the identified media.

In some examples, the act of determining the source identifier includes receiving, from a meter computing system at the media presentation environment, one or more of an IP address or a domain name associated with the media source; and determining the source identifier based on data that maps IP addresses and domain names to corresponding media sources.

In some examples, method 500 also includes receiving the meter signatures from the meter computing system; and generating the meter hash keys based on the meter signatures. The meter computing system can include a first meter device and a second meter device, where the first meter device is configured to generate the meter signatures and transmit the meter signatures to the audience measurement computing system, and where the second meter device is configured to monitor network traffic to the media presentation device and transmit one or more of the IP address of the domain name to the audience measurement computing system.

In some examples, the act of determining the source identifier includes determining the source identifier based on predetermined audience data that maps one or more of a media presentation environment identifier of the media presentation environment or an audience member identifier of the audience member to one or more source identifiers.

In some examples, the act of using the meter hash keys and the source identifier as a basis to select the set of reference hash keys includes: for each of the meter hash keys, querying a database for one or more reference hash keys that match the meter hash key and correspond to the source identifier; and receiving the set of reference hash keys in response to the querying, where the database comprises data that maps reference hash keys to respective source identifiers.

In some examples, the act of using the meter hash keys and the source identifier as a basis to select the set of reference hash keys includes: for each of the meter hash keys, querying a database for one or more reference hash keys that match the meter hash key; and for each of the one or more reference hash keys: determining that the reference hash key corresponds to the source identifier, and based on the determination that the reference hash key corresponds to the source identifier, storing the reference hash key in a data structure associated with a particular one of the media identifiers.

In some examples, the act of identifying the media based on the set of reference hash keys includes: selecting, from the set of reference hash keys, a subset of reference hash keys that satisfy a set of validation conditions; and identifying the media based on the subset of reference hash keys.

IV. Example Computing Device

Any one or more of the above-described components, such as AME server(s) 104, the first meter device 114, or the second meter device 116, can take the form of a computing device, or a computing system that includes one or more computing devices.

Figure 6:
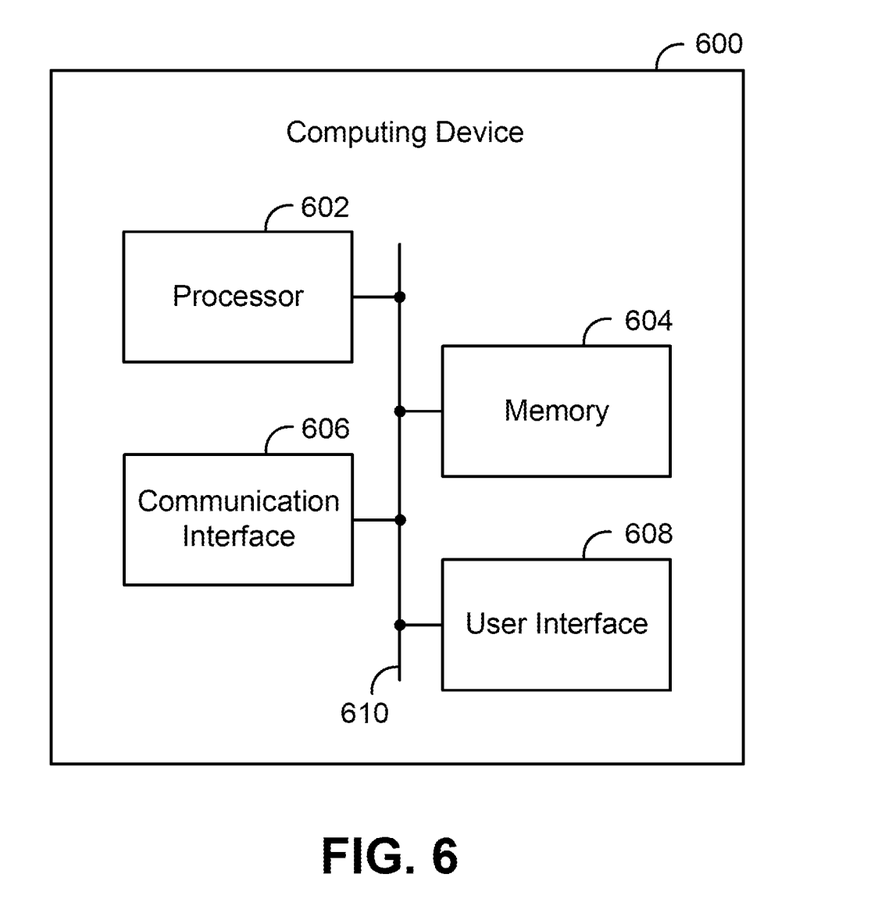
FIG. 6 is a simplified block diagram of an example computing device.

FIG. 6 is a simplified block diagram of an example computing device 600. The computing device 600 can be configured to perform one or more operations, such as the operations described in this disclosure. As shown, the computing device 600 can include various components, such as a processor 602, memory 604, a communication interface 606, and/or a user interface 608. These components can be connected to each other (or to another device, system, or other entity) via a connection mechanism 610.

The processor 602 can include one or more general-purpose processors and/or one or more special-purpose processors.

Memory 604 can include one or more volatile, non-volatile, removable, and/or non-removable storage components, such as magnetic, optical, or flash storage, and/or can be integrated in whole or in part with the processor 602. Further, memory 604 can take the form of a non-transitory computer-readable storage medium, having stored thereon computer-readable program instructions (e.g., compiled or non-compiled program logic and/or machine code) that, upon execution by the processor 602, cause the computing device 600 to perform one or more operations, such as those described in this disclosure. The program instructions can define and/or be part of a discrete software application. In some examples, the computing device 100 can execute the program instructions in response to receiving an input (e.g., via the communication interface 606 and/or the user interface 608). Memory 604 can also store other types of data, such as those types described in this disclosure. In some examples, memory 604 can be implemented using a single physical device, while in other examples, memory 604 can be implemented using two or more physical devices.

The communication interface 606 can include one or more wired interfaces (e.g., an Ethernet interface) or one or more wireless interfaces (e.g., a cellular interface. Wi-Fi interface, or Bluetooth® interface). Such interfaces allow the computing device 600 to connect with and/or communicate with another computing device over a computer network (e.g., a home Wi-Fi network, cloud network, or the Internet) and using one or more communication protocols. Any such connection can be a direct connection or an indirect connection, the latter being a connection that passes through and/or traverses one or more entities, such as a router, switcher, server, or other network device. Likewise, in this disclosure, a transmission of data from one computing device to another can be a direct transmission or an indirect transmission.

The user interface 608 can facilitate interaction between computing device 600 and a user of computing device 600, if applicable. As such, the user interface 608 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, the user interface 608 can include hardware and/or software components that facilitate interaction between the computing device 600 and the user of the computing device 600.

The connection mechanism 610 can be a cable, system bus, computer network connection, or other form of a wired or wireless connection between components of the computing device 600.

One or more of the components of the computing device 600 can be implemented using hardware (e.g., a digital signal processor (DSP), an application-specific integrated circuit (ASIC), a field-programmable gate array (FPGA), another programmable logic device, or discrete gate or transistor logic), software executed by one or more processors, firmware, or any combination thereof. Moreover, any two or more of the components of the computing device 600 can be combined into a single component, and the function described herein for a single component can be subdivided among multiple components.

V. Example Variations

Although the examples and features described above have been described in connection with specific entities and specific operations, in some scenarios, there can be many instances of these entities and many instances of these operations being performed, perhaps contemporaneously or simultaneously, on a large-scale basis.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A non-transitory computer-readable storage medium, having stored thereon program instructions that, upon execution by a processor of an audience measurement computing system, cause performance of operations comprising:
   determining a source identifier that identifies a media source from which media presented by a media presentation device at a media presentation environment is received;
   using meter hash keys and the source identifier as a basis to select, from stored reference hash keys generated based on reference signatures representing previously-identified media, a set of reference hash keys that match the meter hash keys and correspond to the source identifier, each reference hash key associated with a corresponding media identifier, wherein the meter hash keys are generated based on meter signatures representing the media;
   identifying the media by matching at least a subset of the meter signatures to at least a subset of reference signatures from which the set of reference hash keys selected using the meter hash keys a ad the source identifier were generated; and
   generating exposure data that credits exposure of an audience member at the media presentation environment to the identified media.

2. The non-transitory computer-readable storage medium of claim 1, wherein determining the source identifier comprises:
   receiving, from a meter computing system at the media presentation environment, one or more of an Internet Protocol (IP) address or a domain name associated with the media source; and
   determining the source identifier based on data that maps IP addresses and domain names to corresponding media sources.

3. The non-transitory computer-readable storage medium of claim 2, the operations further comprising:
   receiving the meter signatures from the meter computing system; and
   generating the meter bash keys based on the meter signatures.

4. The non-transitory computer-readable storage medium of claim 3, wherein:
   the meter computing system comprises a first meter device and a second meter device, the first meter device is configured to generate the meter signatures and transmit the meter signatures to the audience measurement computing system, and the second meter device is configured to monitor network traffic to the media presentation device and transmit one or more of the IP address of the domain name to the audience measurement computing system.

5. The non-transitory computer-readable storage medium of claim 1, wherein determining the source identifier comprises determining the source identifier based on predetermined audience data that maps one or more of a media presentation environment identifier of the media presentation environment or an audience member identifier of the audience member to one or more source identifiers.

6. The non-transitory computer-readable storage medium of claim 1, wherein the media source comprises a streaming media source.

7. The non-transitory computer-readable storage medium of claim 1, wherein:
using the meter hash keys and the source identifier as a basis to select the set of reference hash keys comprises:
for each of the meter hash keys, querying a database for one or more reference hash keys that match the meter hash key and correspond to the source identifier; and
receiving the set of reference hash keys in response to the querying, and
the database comprises data that maps reference hash keys to respective source identifiers.

8. The non-transitory computer-readable storage medium of claim 1, wherein using the meter hash keys and the source identifier as a basis to select the set of reference hash keys comprises:
for each of the meter hash keys, querying a database for one or more reference hash keys that match the meter hash key; and
for each of the one or more reference hash keys:
determining that the reference hash key corresponds to the source identifier, and
based on the determination that the reference hash key corresponds to the source identifier, storing the reference hash key in a data structure associated with a particular one of the media identifiers.

9. The non-transitory computer-readable storage medium of claim 1, wherein identifying the media based on the set of reference hash keys comprises:
selecting, from the set of reference hash keys, a subset of reference hash keys that satisfy a set of validation conditions; and
identifying the media based on the subset of reference hash keys.

10. A method performed by an audience measurement computing system, the audience measurement computing system comprising a processor, the method comprising:
determining a source identifier that identifies a media source from which media presented by a media presentation device at a media presentation environment is received;
using meter hash keys and the source identifier as a basis to select, from stored reference hash keys generated based on reference signatures representing previously-identified media, a set of reference hash keys that match the meter hash keys and correspond to the source identifier, each reference hash key associated with a corresponding media identifier, wherein the meter hash keys are generated based on meter signatures representing the media;

identifying the media by matching es subset of the meter signatures to at least a subset of reference signatures from which the set of reference hash keys selected using the meter hash keys and the source identifies were generated; and generating exposure data that credits exposure of an audience member at the media presentation environment to the identified media.

11. The method of claim 10, wherein determining the source identifier comprises:
receiving, from a meter computing system at the media presentation environment, one or more of an Internet Protocol (IP) address or a domain name associated with the media source; and
determining the source identifier based on data that maps IP addresses and domain names to corresponding media sources.

12. The method of claim 11, further comprising:
receiving the meter signatures from the meter computing system; and
generating the meter hash keys based on the meter signatures.

13. The method of claim 12, wherein:
the meter computing system comprises a first meter device and a second meter device,
the first meter device is configured to generate the meter signatures and transmit the meter signatures to the audience measurement computing system, and
the second meter device is configured to monitor network traffic to the media presentation device and transmit one or more of the IP address of the domain name to the audience measurement computing system.

14. The method of claim 10, wherein determining the source identifier comprises determining the source identifier based on predetermined audience data that maps one or more of a media presentation environment identifier of the media presentation environment or an audience member identifier of the audience member to one or more source identifiers.

15. The method of claim 10, wherein:
using the meter hash keys and the source identifier as a basis to select the set of reference hash keys comprises:
for each of the meter bash keys, querying a database for one or more reference hash keys that match the meter hash key and correspond to the source identifier; and
receiving the set of reference bash keys in response to the querying, and the database comprises data that maps reference hash keys to respective source identifiers.

16. The method of claim 10, wherein using the meter hash keys and the source identifier as a basis to select the set of reference hash keys comprises:
for each of the meter hash keys, querying a database for one or more reference hash keys that match the meter hash key; and
for each of the one or more reference hash keys:
determining that the reference hash key corresponds to the source identifier, and
based on the determination that the reference hash key corresponds to the source identifier, storing the reference hash key in a data structure associated with a particular one of the media identifiers.

17. An audience measurement computing system comprising:
a processor; and a non-transitory computer-readable storage medium, having stored thereon program instructions that, upon execution by the processor, cause performance of operations comprising:
- determining a source identifier that identifies a media source from which media presented by a media presentation device at a media presentation environment is received;
- using meter hash keys and the source identifier as a basis to select, from stored reference hash keys generated based on reference signatures representing previously-identified media, a set of reference hash keys that match the meter hash keys and correspond to the source identifier, each reference hash key associated with a corresponding media identifier, wherein the meter hash keys are generated based on meter signatures representing the media;
- identifying the media by matching at least subset of the meter signatures to at least a subset of reference signatures from which the set of reference hash keys selected using the meter hash keys and the source identifier were generated; and
- generating exposure data that credits exposure of an audience member at the media presentation environment to the identified media.

18. The audience measurement computing system of claim 17, wherein determining the source identifier comprises:
- receiving, from a meter computing system at the media presentation environment, one or more of an Internet Protocol (IP) address or a domain name associated with the media source; and
- determining the source identifier based on data that maps IP addresses and domain names to corresponding media sources.

19. The audience measurement computing system of claim 17, wherein:
- using the meter hash keys and the source identifier as a basis to select the set of reference hash keys comprises:
  - for each of the meter hash keys, querying a database for one or more reference hash keys that match the meter hash key and correspond to the source identifier; and
  - receiving the set of reference hash keys in response to the querying, and
- the database comprises data that maps reference hash keys to respective source identifiers.

20. The audience measurement computing system of claim 17, wherein using the meter hash keys and the source identifier as a basis to select the set of reference hash keys comprises:
- for each of the meter hash keys, querying a database for one or more reference hash keys that match the meter hash key; and
- for each of the one or more reference hash keys:
  - determining that the reference hash key corresponds to the source identifier, and
  - based on the determination that the reference hash key corresponds to the source identifier, storing the reference hash key in a data structure associated with a particular one of the media identifiers.

* * * * *